(12) United States Patent
Mangasarian et al.

(10) Patent No.: US 7,421,417 B2
(45) Date of Patent: Sep. 2, 2008

(54) INPUT FEATURE AND KERNEL SELECTION FOR SUPPORT VECTOR MACHINE CLASSIFICATION

(75) Inventors: Olvi L. Mangasarian, Madison, WI (US); Glenn M. Fung, Bryn Mawr, PA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 318 days.

(21) Appl. No.: 10/650,121

(22) Filed: Aug. 28, 2003

(65) Prior Publication Data

US 2005/0049985 A1    Mar. 3, 2005

(51) Int. Cl.
*G06E 1/00* (2006.01)
(52) U.S. Cl. .............................. 706/20; 706/46; 382/155; 382/181; 382/224
(58) Field of Classification Search ........................ None
See application file for complete search history.

(56) References Cited

U.S. PATENT DOCUMENTS

| | | | | |
|---|---|---|---|---|
| 6,112,195 | A * | 8/2000 | Burges | 706/20 |
| 6,134,344 | A * | 10/2000 | Burges | 382/155 |
| 6,327,581 | B1 | 12/2001 | Platt | |
| 6,571,225 | B1 * | 5/2003 | Oles et al. | 706/12 |
| 6,728,690 | B1 * | 4/2004 | Meek et al. | 706/25 |
| 2002/0165854 | A1 | 11/2002 | Blayvas et al. | |
| 2003/0093393 | A1 | 5/2003 | Mangasarian et al. | |
| 2003/0115030 | A1 * | 6/2003 | Ewing | 703/11 |
| 2003/0167135 | A1 * | 9/2003 | Ewing | 702/22 |
| 2005/0105794 | A1 * | 5/2005 | Fung | 382/159 |
| 2005/0119837 | A1 * | 6/2005 | Prakash et al. | 702/27 |
| 2005/0171923 | A1 * | 8/2005 | Kiiveri et al. | 707/1 |

OTHER PUBLICATIONS

"Empirical error based optimizationof SVM kernels: application to digit image recognition", Ayat, N. E., Cheriet, M., Suen, C. Y., Frontiers in Handwriting Recognition, 2002. Proceedings 8th Intl, Aug. 6-8, 2002, pp. 292-297.*
"Multiple centrality corrections in a primal-dual method for linear programming", Jacek Gondzio, Computational Optimization and Applications, vol. 6, No. 2, Sep. 1996, pp. 137-156.*

(Continued)

*Primary Examiner*—David R. Vincent
*Assistant Examiner*—Mai T. Tran
(74) *Attorney, Agent, or Firm*—Shumaker & Sieffert, P.A.

(57) ABSTRACT

A feature selection technique for support vector machine (SVM) classification makes use of fast Newton method that suppresses input space features for a linear programming formulation of a linear SVM classifier, or suppresses kernel functions for a linear programming formulation of a nonlinear SVM classifier. The techniques may be implemented with a linear equation solver, without the need for specialized linear programming packages. The feature selection technique may be applicable to linear or nonlinear SVM classifiers. The technique may involve defining a linear programming formulation of a SVM classifier, solving an exterior penalty function of a dual of the linear programming formulation to produce a solution to the SVM classifier using a Newton method, and selecting an input set for the SVM classifier based on the solution.

57 Claims, 3 Drawing Sheets

OTHER PUBLICATIONS

W. H. Wolberg and O.L. Mangasarian, "Multisurface Method of Pattern Separation for Medical Diagnosis Applied to Breat Cytology," Proc. Natl. Acad. Sci. USA, vol. 87, pp. 9193-9196, Dec. 1990.

Y. -J. Lee and O.L. Mangasarian, "SSVM: A Smooth Support Vector Machine for Classification," Data Mining Institute Technical Report 99-03, Sep. 1999. Computational Optimization and Applications 20, pp. 1-22, 2001.

Y. -J. Lee, O.L. Mangasarian and W.H. Wolberg, "Breast Cancer Survival and Chemotherapy: A Support Vector Machine Analysis," Data Mining Institute Technical Report 99-10, Dec. 1999. DIMACS Series in Discrete Mathematics and Computer Science, vol. 55, American Mathematical Society, pp. 1-10, 1999.

N. Cristianini and John Shawe-Taylor, "An Introduction to Support Vector Machines and other Kernel-Based Learning Methods," Cambridge University Press, 2000, ISBN: 0 521 78019 5, 10 pgs.

O.L. Mangasarian and D.R. Musicant, "Data Discrimination via Nonlinear Generalized Support Vector Machines," Mathematical Programming Technical Report 99-03, Computer Sciences Department, Unversity of Wisconsin, Madison, Wisconsin, Mar. 1999, 14 pgs.

O.L. Mangasarian and D.R. Musicant,"Successive Overrelaxation for Support Vector Machines," IEEE Transactions on Neural Networks, vol. 10, No. 5, Sep. 1999, pp. 1032-1037.

A.I. Su et al., "Molecular Classification of Human Carcinomas by Use of Gene Expression Signatures," Cancer Research 61, Oct. 15, 2001, pp. 7388-7393.

Barlogie, B., Cussens, J., Hardin, J., Page, D., Shaughnessy, J., Waddell, M., and Zhan, F., "Comparative data mining for microarrays: A case study based on multiple myeloma," Technical Report 1453, Computer Sciences Department, University of Wisconsin, Madison, Nov. 2002.

Bradley, P. S., and Mangasarian, O. L., "Feature Selection via Concave Minimization and Support Vector Machines," Machine Learning Proceedings of the Fifteenth International Conference (ICML '98) pp. 82-90, San Francisco, CA 1998.

Fung, G. and Mangasarian, O. L., "A Feature Selection Newton Method for Support Vector Machine Classification," Data Mining Institute Technical Report 02-03, pp. 1-18, Sep. 2002. Computational Optimization and Applications, to appear.

Fung, G. and Mangasarian, O. L., "Finite Newton Method for Lagrangian Support Vector Machine Classification," Data Mining Institute Technical Report 02-03, pp. 1-22, Feb. 2002. Computational Optimization and Applications, Neurocomputing 55 on Sep. 2003.

Golub, G. H. and Van Loan, C. F., "Matrix computations," The John Hopkins University Press, Baltimore, Maryland, 3$^{rd}$ edition, pp. 48-86, 1996.

Lee Y. J. and Mangasarian, O. L., "RSVM: Reduced Support Vector Machines," Data Mining Institute Technical Report 00-07, Computer Sciences Department, University of Wisconsin, Madison, Wisconsin, pp. 1-17, Jul. 2000.

Mangasarian, O. L., "Generalized Support Vector Machines," in Advances in Large Margin Classifiers, MIT Press, Cambridge, Massachusetts, Bartlett, P., Scholkopf, B., Schuurmans, D., and Smola, A., editors, pp. 135-146, 2000.

Mangasarian, O. L., "Parallel Gradient Distribution in Unconstrained Optimization," SIAM Journal on Control and Optimization, 33(6):1916-1925, 1995.

Mangasarian, O. L. and Musicant, D. R., "Lagrangian Support Vector Machine," Journal of Machine Learning Research, 1:161-177, 2001.

Odewahn, E. Stockwell, R. Pennington, R. Humphreys, and W. Zumach, "Automated Star/Galaxy Discrimination with Neural Networks," Astronomical Journal, 103(1): 318-331, 1992.

Burges, Christopher J.C., "A Tutorial on Support Vector Machines for Pattern Recognition," Data Mining and Knowledge Discovery, vol. 2, No. 2, pp. 121-167, 1998.

Fung, Glen, Mangasarian, Olvi L., "Data Selection for Support Vactor Machines Classifiers," Data Mining Institute Report 00-02, 7 pgs., Feb. 2000.

Trotter, Matthew, "Support Vector Machines for QSAR Analysis," Department of Computer Science, University of College London, 25 pgs., undated.

F. Facchinei, Minimization of $SC^1$ functions and the Maratos effect. Operations Research Letters, 17:131-137, 1995.

J.B. Hiriart-Urruty, J.J. Strodiot, and V.H. Nguyen, Generalized hessian matrix and second-order optimality conditions for probelms with $C^{1,1}$ data, Applied Mathematics and Optimization, 11:43-56, 1984.

CPLEX, http://www.llog.com/products/cplex, 1 page (last printed Feb. 10, 2004).

S. Lucidi, A new result in the theory and computation of the least-norm solution of a linear program, Journal of Optimization Therory, and Applictions, 55:103-117, 1987.

O.L. Mangasarian, Normal solutions of linear programs, Mathematical Programming Study, 22:206-216, 1984.

O.L. Mangasarian, Arbitrary-norm separting plane, Operations Research Letters, 24:15-23, 1999.

O.L. Mangasarian, A finite Newton method for classification problems, Technical Report 01-11, Data Mining Institute, Computer Sciences Department, University of Wisconsin, pp. 1-17, Dec. 2001.

O.L. Mangasarian and R.R. Meyer, Nonlinear perturbation of linear programs, SIAM Journal on Control and Optimization, 17(6):745-752, Nov. 1979.

O.L. Mangasarian, A Newton Method for Linear Programming, Powerpoint Presentation, Mathematics Department, University of California at San Diego, 21 pgs., Jul. 26, 2002.

O.L. Mangasarian, A Newton Method for Linear Programming, Technical Report 02-02, Data Mining Institute, Computer Sciences Department, University of Wisconsin, pp. 1-20, Mar. 2002. Revised Dec. 2002, Jrnl. of Opti. Theory & Appl. 121,2004, pp. 1-18.

Office Action dated Jul. 25, 2007 for U.S. Appl. No. 10/114,419, filed Apr. 1, 2002, (11 pages).

\* cited by examiner

INPUT FEATURE AND KERNEL SELECTION FOR SUPPORT VECTOR MACHINE CLASSIFICATION

This invention was made with Government support awarded by USAF/AFOSR, and Contract No. F49620-00-1-0085 awarded by the U.S. Government. The United States may have certain rights in this invention.

TECHNICAL FIELD

This invention relates to classification techniques and, more particularly, to support vector machine (SVM) classification.

BACKGROUND

A support vector machine (SVM) is a powerful tool for data classification and is often used for data mining operations. Classification is achieved by identifying a linear or nonlinear separating surface in the input space of a data set. The separating surface distinguishes between two classes of elements forming an extremely large data set. Advantageously, the separating surface depends only on a subset of the original data. This subset of data, which is used to define the separating surface, constitutes a set of support vectors.

To enhance performance of an SVM classifier, it is desirable to make the set of support vectors that defines the separating surface as small as possible, e.g., by reducing the set of input features in the case of a linear SVM classifier, or reducing a set of kernel functions in the case of a nonlinear SVM classifier. Applications such as fraud detection, credit evaluation, gene expression, and medical diagnosis or prognosis, for example, may present an input space with thousands, or even millions, of data points. The ability to suppress less useful data and select a reduced set of meaningful support vectors can greatly enhance the performance of the SVM classifier, in terms of computational resources, speed, and accuracy.

SUMMARY

The invention is directed to a feature or kernel selection technique for SVM classification. In accordance with the invention, the selection technique makes use of a fast Newton method that suppresses input space features for a linear programming formulation of a linear SVM classifier, which can be referred to as a Newton Linear Programming Support Vector Machine (NLPSVM). The technique also may be applied to suppress kernel functions in the case of a nonlinear SVM classifier. The Newton method described herein can implemented with a linear equation solver, without the need for specialized and costly linear programming packages. The selection technique may be applicable to linear SVM classifiers or nonlinear SVM classifiers, producing a reduced set of input features of kernel functions, respectively.

The fast Newton method is used to solve an exterior penalty function of a dual of the linear programming formulation of the SVM for a finite value of the penalty parameter. The linear programming formulation is based on a 1-norm SVM formulation that is selected, in accordance with the invention, to generate very sparse solutions. By solving the exterior penalty function of the dual of the linear programming formulation, the method produces an exact least 2-norm solution to the SVM classifier. The resultant separating hyperplane relies on very few input features. When the resultant surface is nonlinear, it uses a reduced number of kernel functions.

In one embodiment, the invention provides a method comprising defining a linear programming formulation of a SVM classifier, solving an exterior penalty function of a dual of the linear programming formulation to produce a solution to the SVM classifier, and selecting an input set for the SVM classifier based on the solution. The input set includes a reduced set of input features in the case of a linear SVM classifier, or a reduced set of kernel functions in the case of a nonlinear SVM classifier.

In another embodiment, the invention provides a classification system comprising a processor that applies a linear programming formulation of a SVM classifier to classify data based on a small subset of input features, and an input module that generates the input features based on a solution of an exterior penalty function of a dual of the linear programming formulation.

In a further embodiment, the invention provides a computer-readable medium comprising instructions to cause a processor to define a linear programming formulation of a SVM classifier, solve an exterior penalty function of a dual of the linear programming formulation to produce a solution to the SVM classifier, and select input features for the SVM classifier based on the solution.

The invention may provide a number of advantages. For example, the feature-kernel selection techniques described herein are capable of substantially reducing the number of input features necessary to define an SVM classifier. By suppressing input space features, the techniques can enhance the performance of the SVM classifier in terms of computational resources, speed, and accuracy. In addition, feature selection can be achieved with the aid of a simple linear equation solver, rather than specialized linear programming packages that present additional complexity and cost.

When a linear classifier is used, a sparse solution implies that the separating hyperplane depends on very few input features, making the feature suppression method very effective for feature selection for classification problems. When a nonlinear classifier is used, a sparse solution implies that very few kernel functions determine the classifier, making the nonlinear classifier easier to store and fast to evaluate. Accordingly, a feature-kernel selection technique as described herein may be advantageous in either case.

The details of one or more embodiments are set forth in the accompanying drawings and the description below. Other features, objects, and advantages will be apparent from the description and drawings, and from the claims.

DETAILED DESCRIPTION

Figure 1:
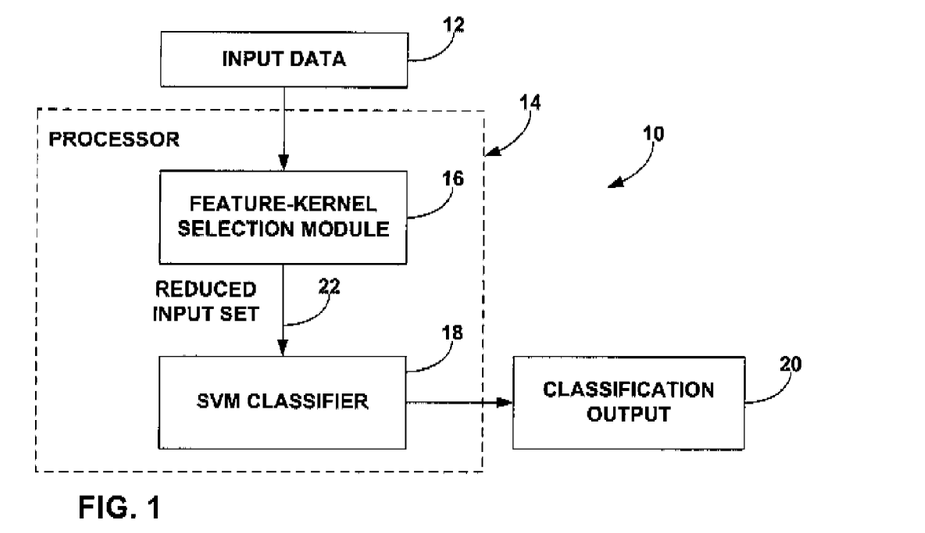
FIG. 1 is a block diagram illustrating a system for feature selection for an SVM classifier in accordance with the invention.

FIG. 1 is a block diagram illustrating a system 10 for feature selection for an SVM classifier. As shown in FIG. 1, system 10 includes a data storage medium containing a set of input data 12, and a processor 14 that implements a feature-kernel selection module 16 and an SVM classifier 18. Processor 14 may reside within a general purpose computer or computer workstation. Feature-kernel selection module 16 and SVM classifier 18 may take the form of software processes or modules executing on processor 14, or on different processors. Hence, in some embodiments, the invention may be embodied as computer-readable medium including instructions for execution by processor 14.

Feature-kernel selection module 16 may operate independently of SVM classifier 18 to simultaneously select a reduced input set 22, comprising input features for linear classifiers or kernel Functions for nonlinear classifiers, and generate a linear or nonlinear SVM classifier 18 based on input data 12 while utilizing the reduced input set 22 of input features or reduced kernel functions. In general, feature-kernel selection module 16 defines a linear programming formulation of SVM classifier 18, solves an exterior penalty function of a dual of the linear programming formulation to produce a solution to the SVM classifier, and selects an input set for the SVM classifier based on the solution. The input set includes selected features in the case of a linear classifier, or selected kernel functions in the case of a nonlinear classifier.

SVM classifier 18 generates classification output 20, which classifies input data 12 into two classes based on the reduced input set 22 of input features or kernel functions generated by feature-kernel selection module 16. SVM classifier 18 may be based on a linear or nonlinear SVM. In the case of a linear SVM, feature-kernel selection module 16 generates a reduced set of input features. In the case of a nonlinear SVM, feature-kernel selection module 16 generates a reduced set of kernel functions. Classification output 20 may be useful in a variety of applications including, for example, fraud detection, credit evaluation, gene expression, and medical diagnosis and prognosis.

Feature-kernel selection module 16 selects a small subset of input features or a small number of kernel functions from a large set of input data 12 to define SVM classifier 18. Feature-kernel selection module 16 may be implemented with a linear equation solver, without the need for specialized and costly linear programming packages. In addition, as discussed above, feature-kernel selection module 16 may be effective in suppressing input features for linear SVM classifiers and suppressing kernel functions for nonlinear SVM classifiers. In operation, feature-kernel selection module 16 applies a fast Newton method to solve an exterior penalty function for a dual of a linear programming formulation of SVM classifier 18 to solve the SVM classifier function.

Feature-kernel selection module 16 applies the Newton method to the dual of a 1-norm linear programming formulation that is known to produce very sparse solutions. By solving the exterior penalty function of the dual of the 1-norm linear programming formulation, for a finite value of the penalty parameter, feature-kernel selection module 16 produces an exact least 2-norm solution to the SVM classifier 18. The resultant separating hyperplane defined by SVM classifier 18 relies on a reduced set of input features. In the case of a nonlinear SVM classifier, few kernel functions are needed.

SVM classifier 18 applies the input features (or kernel functions) produced by feature-kernel selection module 16 to generate classification output 20 for the larger set of input data 12. Hence, feature-kernel selection module 16 applies a fast Newton method that suppresses input features to define a linear SVM classifier that depends on very few input features or a nonlinear classifier with few kernel functions. Notably, feature-kernel selection module 16 enables formulation of an SVM classifier 18 that is capable of handling classification problems in very high dimensional spaces using only a linear equation solver, thereby eliminating the need for complex and costly linear programming packages. The SVM classifier generated with the resulting input features can be referred to as a Newton Linear Programming Support Vector Machine (NLPSVM).

Figure 2:
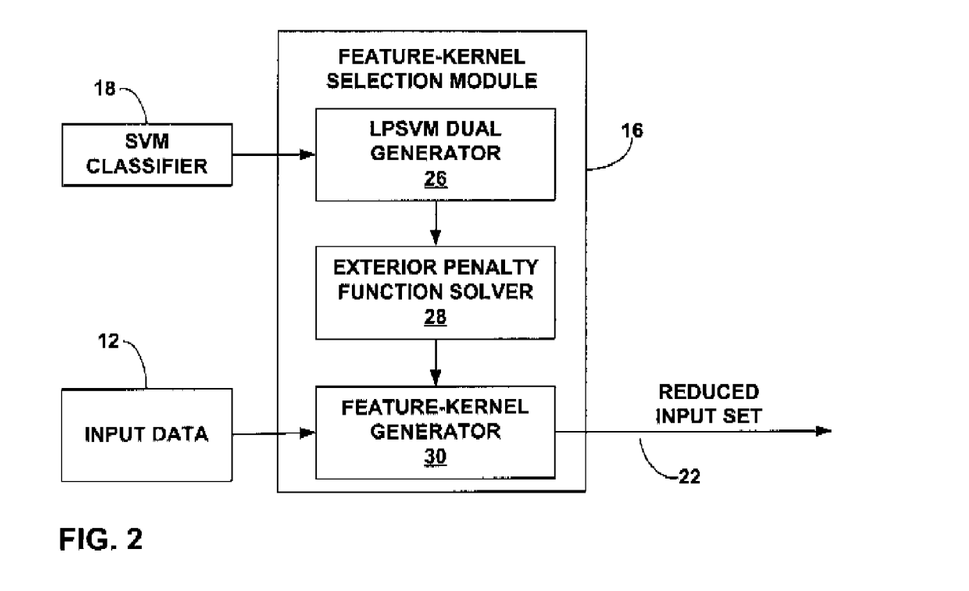
FIG. 2 is a block diagram illustrating a feature-kernel selection module of the system of FIG. 1 in greater detail.

FIG. 2 is a block diagram illustrating an exemplary feature-kernel selection module 16 of system 10 of FIG. 1 in greater detail. As shown in FIG. 2, feature-kernel selection module 16 may include a linear programming support vector machine (LPSVM) dual generator 26 that produces the dual of a linear programming formulation of SVM classifier 18. Again, LPSVM dual generator 26 produces the dual of a 1-norm linear programming formulation that is selected to produce sparse solutions.

An exterior penalty function solver 28 solves an exterior penalty function of the dual of the linear programming formulation to solve the SVM classifier function. Based on the solution of the exterior penalty function, a feature-kernel selection generator 30 processes input data 12 to suppress redundant features or kernels and thereby generate a reduced input set 22 of feature or kernel coefficients for use by SVM classifier 18. The structural representation of feature-kernel selection module 16 as a set of functional modules in FIG. 2 is for purposes of illustration, and should not be considered limiting of the invention as broadly embodied and described herein.

Figure 3:
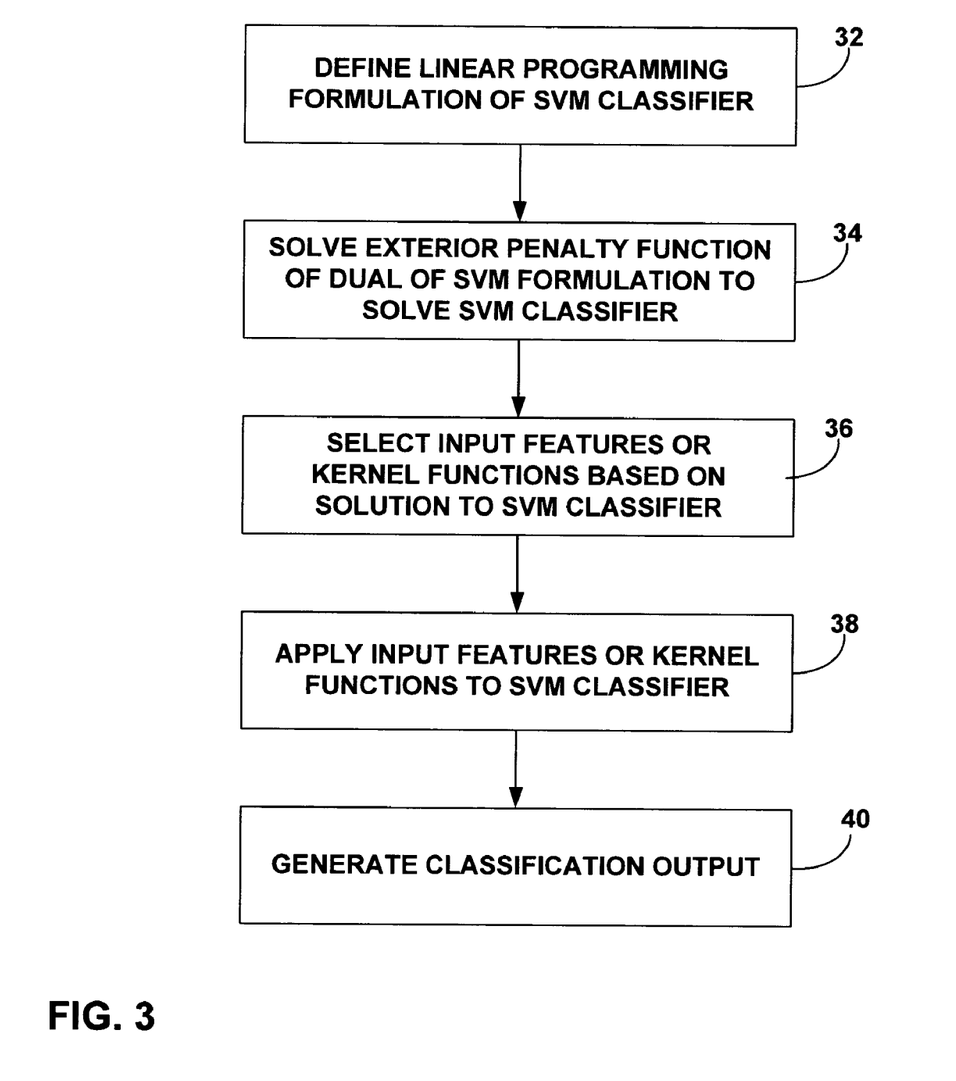
FIG. 3 is a flow diagram illustrating a feature selection method for a SVM classifier in accordance with the invention.

FIG. 3 is a flow diagram illustrating a feature or kernel selection method for an SVM classifier 18, as shown in FIG. 1. The feature-kernel selection method is implemented by feature-kernel selection module 16, shown in FIGS. 1 and 2. As shown in FIG. 3, feature-kernel selection module 16 defines a linear programming formulation of SVM classifier 18 (32), and solves the exterior penalty function of the dual of the linear programming formulation of the SVM classifier (34). Based on the solution to the exterior penalty function, feature-kernel selection module 16 selects input features or kernel functions using the input dataset (36). Feature-kernel selection module 16 then applies the input features or kernel functions to SVM classifier 18 (38), which generates classification output (40) for the input data.

Various details of feature-kernel selection module 16, the linear programming formulation, the Newton method applied by the feature-kernel selection module, and exemplary algorithms useful in implementation of the feature-kernel selection module will be described below. In general, the feature-kernel selection techniques contemplated by the invention permit an SVM classifier to handle classification problems in very high dimensional spaces with very few input features. As an example, set forth in greater detail below, the feature selection technique has been observed to be effective in reducing an input space having 28,032 dimensions to just 7 input features for definition of an operable linear SVM classifier. Hence, the techniques described herein are effective in selecting a subset of input features from a larger set of input features that is substantially larger than the subset of input features. Advantageously, the Newton method implemented by feature-kernel selection module 16 requires only a linear equation solver and can be represented in several lines of MATLAB code.

By minimizing an exterior penalty function of the dual of a 1-norm linear programming formulation of SVM classifier 18 using the fast Newton method, for a finite value of the penalty parameter, an exact least 2-norm solution to the SVM classifier is obtained. This approach is based on a 1-norm SVM linear programming formulation that is selected to generate very sparse solutions. A suitable 1-norm SVM formulation is described in "Feature Selection via Concave Minimization and Support Vector Machines," by P. S. Bradley and O. L.

Mangasarian, in Machine Learning Proceedings of the Fifteenth International Conference (ICML '98), pages 82-90, San Francisco, Calif., 1998, J. Shavlik, editor. As detailed in the Bradley and Mangasarian paper, this 1-norm SVM formulation has been observed to produce very sparse solutions.

Another fast Newton method (NSVM) was also proposed recently, in G. Fung and O. L. Mangasarian, "Finite Newton method for Lagrangian support vector machine classification," Technical Report 02-01, Data Mining Institute, Computer Sciences Department, University of Wisconsin, Madison, Wis., 2002 (to appear in Neurocomputing), based on a quadratic programming formulation of support vector machines. A quadratic programming formulation, unlike a linear programming formulation as described herein, does not generate sparse solutions and hence does not suppress input features. This characteristic contrasts sharply with the strong feature suppression property of the Newton method described herein.

With the linear and nonlinear kernel classification problems formulated as a linear programming problem, rather than a quadratic programming formulation, an exact solution to the linear programming SVM can be obtained by minimizing the exterior penalty function of its dual for a finite value of the penalty parameter. The fast Newton algorithm is used to solved the exterior penalty and establish its global convergence. The linear programming formulation and the Newton algorithm will be described in detail below, following a discussion of applicable notation used throughout this disclosure.

First, vectors will be column vectors unless transposed to a row vector by a prime superscript'. For a vector $x$ in the n-dimensional real space $R^n$, the plus function $x_+$ is defined as $(x_+)_i = \max\{0, x_i\}$, $i=1,\ldots,n$, while $x^*$ denotes the subgradient of $x_+$ which is the step function defined as $(x^*)_i = 1$ if $x_i > 0$, $(x^*)_i = 0$ if $x_i < 0$, and $(x^*)_i \in [0, 1]$ if $x_i = 0$, $i=1,\ldots,n$. Thus, $(x^*)_i$ is any value in the interval $[0, 1]$, when $x_i = 0$, and typically $(x^*)_i = 0.5$ in this case. The scalar (inner) product of two vectors $x$ and $y$ in the n-dimensional real space $R^n$ will be denoted by $x'y$, the 2-norm of $x$ will be denoted by $\|x\|$ and $x \perp y$ denotes orthogonality, i.e., $x'y=0$. The 1-norm and $\infty$-norm will be denoted by $\|\cdot\|_1$ and $\|\cdot\|_\infty$, respectively.

For a matrix $A \in R^{m \times n}$, $A_i$ is the ith row of A, which is a row vector in $R^n$, and $\|A\|$ is the 2-norm of A: $\max \|Ax\|$ for $\|x\|=1$. A column vector of ones of arbitrary dimension will be denoted by e and the identity matrix of arbitrary order will be denoted by I. For $A \in R^{m \times n}$ and $B \in R^{n \times 1}$, the kernel K(A, B) [27,4,18] is an arbitrary function which maps $R^{m \times n} \times R^{n \times 1}$ into $R^{m \times 1}$. In particular, if x and y are column vectors in $R^n$, then K(x', y) is a real number, K(x', A') is a row vector in $R^m$ and K(A, A') is an m×m matrix. If f is a real valued function defined on the n-dimensional real space $R^n$, the gradient of $f$ at x is denoted by $\nabla f(x)$, which is a column vector in $R^n$ and the n×n matrix of second partial derivatives of $f$ at x is denoted by $\nabla^2 f(x)$.

For a piecewise quadratic function such as $f(x) = \frac{1}{2}\|(Ax-b)_+\|^2 + \frac{1}{2}x'Px$, where $A \in R^{m \times n}$, $P \in R^{n \times n}$, $P=P'$, P positive semidefinite and $b \in R^m$, the ordinary Hessian does not exist because its gradient, the n×1 vector $\nabla f(x) = A'(Ax-b)_+ + Px$, is not differentiable. However, one can define its generalized Hessian, which is the n×n symmetric positive semidefinite matrix:

$$\partial^2 f(x) = A' \text{diag}(Ax-b)^* A + P \qquad (1)$$

where $\text{diag}(Ax-b)^*$ denotes an m×m diagonal matrix with diagonal elements $(A_i x - b_i)^*$, $i=1,\ldots,m$. The generalized Hessian has many of the properties of the regular Hessian in relation to $f(x)$. If the smallest eigen value of $\partial^2 f(x)$ is greater than some positive constant for all $x \in R_n$, then $f(x)$ is a strongly convex piecewise quadratic function on $R^n$. Throughout this disclosure, the notation:= will denote definition.

The fundamental classification problems that lead to a linear programming formulation for SVM classifier 18 will now be described. Consider the problem of classifying m points in the n-dimensional real space $R^n$, represented by the m×n matrix A, according to membership of each point $A_i$ in the classes +1 or -1 as specified by a given m×m diagonal matrix D with ones or minus ones along its diagonal. For this formulation, the standard SVM with a linear kernel AA' is given by the following quadratic program for some $v > 0$:

$$\min_{(w,\gamma,y)} \; ve'y + \frac{1}{2}w'w \qquad (2)$$

$$\text{s.t.} \quad D(Aw - e\gamma) + y \geq e$$

$$y \geq 0.$$

Figure 4:
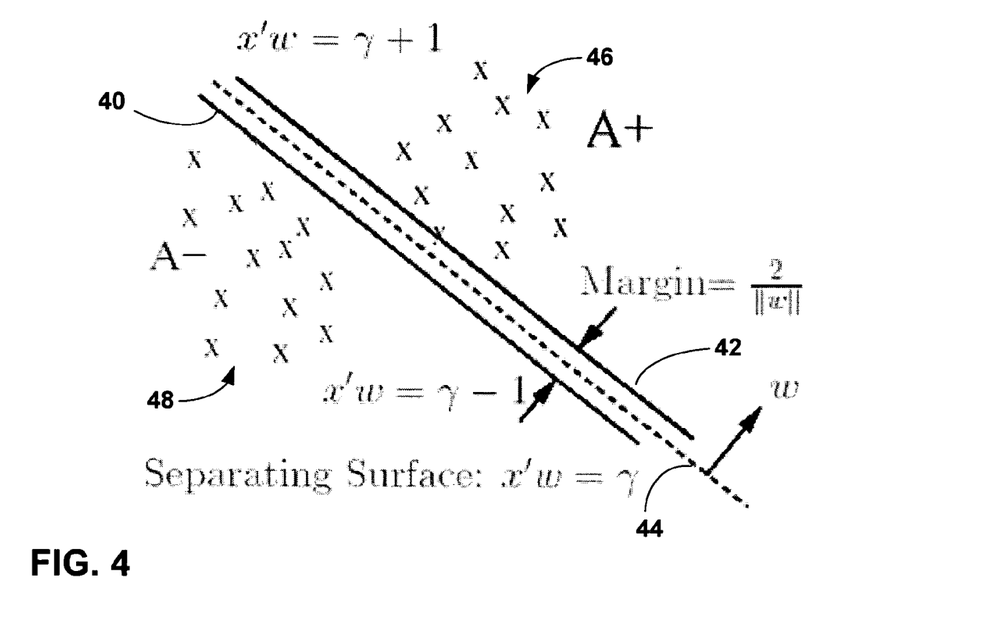
FIG. 4 is a graph of bounding planes and a separating plane generated by an SVM classifier.

FIG. 4 is a graph of bounding planes 40, 42 and a separating plane 44 generated by a support vector machine classifier as described herein. As depicted in FIG. 4, w is the normal to the bounding planes:

$$x'w - \gamma = +1$$

$$x'w - \gamma = -1, \qquad (3)$$

and $\gamma$ determines their location relative to the origin. Plane 42 above bounds the class +1 points 46 and plane 40 bounds the class -1 points 48 when the two classes are strictly linearly separable, i.e., when the slack variable $y=0$. The linear separating surface is the plane:

$$x'w = \gamma, \qquad (4)$$

midway between bounding planes 40, 42. If the classes are linearly inseparable, then the two planes 40, 42 bound the two classes with a "soft margin" determined by a nonnegative slack variable y, that is:

$$x'w - \gamma + y_i \geq +1, \text{ for } x' = A_i \text{ and } D_{ii} = +1.$$

$$x'w - \gamma - y_i \leq -1, \text{ for } x' = A_i \text{ and } D_{ii} = -1. \qquad (5)$$

The 1-norm of the slack variable y is minimized with weight $v$ in equation (2). The quadratic term in equation (2), which is twice the reciprocal of the square of the 2-norm distance $$\frac{2}{\|w\|}$$

between the two bounding planes of equation (3) in the n-dimensional space of $w \in R^n$ for a fixed $\gamma$, maximizes that distance, often called the "margin."

FIG. 4 depicts the points represented by A, the bounding planes of equation (3) with margin $$\frac{2}{\|w\|},$$

and the separating plane from equation (4) which separates A+, the points represented by rows of A with $D_{ii}=+1$, from A−, the points represented by rows of A with $D_{ii}=-1$.

In a linear programming formulation of the standard SVM in equation (2), the term $$\frac{1}{2}w'w$$

is replaced by $\|w\|_1$, which is twice the reciprocal of the ∞-norm distance between the bounding planes of equation (3). Importantly, empirical evidence indicates that the 1-norm formulation has the advantage of generating very sparse solutions. As a result, the normal w to the separating plane $x'w=\gamma$ has many zero components, which implies that many input space features do not play a role in defining the linear SVM classifier.

This solution sparseness, and its implications for definition SVM classifier, makes the 1-norm linear programming formulation suitable for feature selection in classification problems. Notably, in addition to the conventional interpretation of smaller ν as emphasizing a larger margin between the bounding planes of equation (3), a smaller ν here also results in a sparse solution. This 1-norm formulation leads to the linear programming problem:

$$\min_{(p,q,\gamma,y)} \nu e'y + e'(p+q) \quad (6)$$
$$\text{s.t.} \quad D(A(p-q)-e\gamma)+y \geq e$$
$$p, q, y \geq 0,$$

where the following substitution for w has been made:

$$w=p-q, p\geq 0, q\geq 0, \quad (7)$$

This substitution results in a linear programming SVM formulation that is different and simpler than previous linear programming SVM formulations. Feature-kernel selection module 16 therefore relies on the dual of the linear programming formulation of equation (6), as follows:

$$\max_{u \in R^m} e'u$$
$$\text{s.t.} \quad -e \leq A'Du \leq e, \quad (8)$$
$$-e'Du = 0,$$
$$u \leq \nu e,$$
$$u \geq 0.$$

The asymptotic exterior penalty function for this dual linear programming formulation of equation (8) is the following nonnegatively constrained minimization problem:

$$\min_{u \geq 0} -\varepsilon e'u + \frac{1}{2}\|(A'Du-e)_+\|^2 + \quad (9)$$
$$\frac{1}{2}\|(-A'Du-e)_+\|^2 + \frac{1}{2}\|e'Du\|^2 + \frac{1}{2}\|(u-\nu e)_+\|^2,$$

where ε is a positive penalty parameter that needs to approach zero for standard penalty application to solve the dual linear programming formulation of equation (8). In the present approach, however, the fact that ε will remain finite is established so that an exact solution to the 1-norm linear programming SVM formulation of equation (6) can be obtained. To do that, the Karush-Kuhn-Tucker necessary and sufficient optimality conditions for the penalty function of equation (9) are stated as follows:

$$0 \leq u \perp (-\epsilon\varepsilon + DA(A'Du-\varepsilon)_+ - \quad (10)$$
$$DA(-A'Du-e)_+ + D\varepsilon e'Du + (u-\nu e)_+ \geq 0,$$

where ⊥ denotes orthogonality. Notably, these conditions in expression (10) are also the necessary and sufficient conditions for finding an exact least 2-norm solution to the linear programming SVM formulation of equation (6) without ε approaching zero. To do that, it is first necessary to formulate the least 2-norm problem for equation (6) as follows:

$$\min_{(p,q,\gamma,y)} \nu e'y + e'(p+q) + \frac{\varepsilon}{2}(\|p\|^2 + \|q\|^2 + \gamma^2 + \|y\|^2) \quad (11)$$
$$\text{s.t.} \quad D(A(p-q)-e\gamma)+y \geq e$$
$$p, q, y \geq 0,$$

with the Karush-Kuhn-Tucker necessary and sufficient optimality conditions stated as follows:

$$0 \leq \epsilon p \perp e + \epsilon p - A'Du \geq 0$$
$$0 \leq \epsilon q \perp e + \epsilon q + A'Du \geq 0$$
$$\epsilon\gamma + e'Du = 0$$
$$0 \leq \epsilon y \perp \nu e + \epsilon y - u \geq 0$$
$$0 \leq u \perp DA(p-q) - De\gamma + y - e \geq 0 \quad (12)$$

It follows that, for any positive ε such that $\epsilon \in (0, \bar{\epsilon}]$ for some $\bar{\epsilon} > 0$, any (p, q, γ, y) satisfying the Karush-Kuhn-Tucker conditions of equation (12) for some $u \in R^m$ is the exact least 2-norm solution to the linear programming SVM formulation of equation (6). However, if the Karush-Kuhn-Tucker conditions of expression (10) are used in the penalty problem of equation (9):

$$p = \frac{1}{\epsilon}(A'Du-e)_+, \quad (13)$$
$$q = \frac{1}{\epsilon}(-A'Du-e)_+,$$
$$\gamma = -\frac{1}{\epsilon}e'Du,$$
$$y = \frac{1}{\epsilon}(u, \nu e)_+,$$

and use is made of the simple equivalence:

$$a=b_+ \Leftrightarrow 0 \leq a \perp (a-b) \geq 0, \quad (14)$$

then equation (13) together with the Karush-Kuhn-Tucker conditions of expression (10) for the exterior penalty function of equation (9), become precisely the Karush-Kuhn-Tucker necessary and sufficient conditions of expression (12) for the least 2-norm linear programming SVM formulation of equation (11). Thus, the proposition set forth below is proven:

Proposition: Equivalence of Least 2-norm LPSVM to Dual Exterior Penalty

A solution u to the dual exterior penalty (DEP) problem (9) for $\epsilon \in (0, \bar{\epsilon}]$ for some $\bar{\epsilon} > 0$, provides an exact least 2-norm solution to the primal linear programming SVM of equation (6) as follows:

$$w = p - q = = \frac{1}{\epsilon}((A'Du - e)_+ - (-A'Du - e)_+), \quad (15)$$

$$\gamma = -\frac{1}{\epsilon}e'Du,$$

$$y = \frac{1}{\epsilon}(u - \nu e)_+.$$

Hence, by minimizing the exterior penalty function, feature-kernel selection module 16 is able to produce a solution to the SVM function.

The foregoing techniques are also useful with nonlinear kernel classifiers. For nonlinear kernel classifiers, this disclosure will generally use the notation described in O. L. Mangasarian, "Generalized support vector machines," in A. Smola, P. Bartlett, B. Scholkopf, and D. Schuurmans, editors, Advances in Large Margin Classifiers, pages 135-146, Cambridge, Mass., 2000, MIT Press. For $A \in R^{m \times n}$ and $B \in R^{n \times l}$, the kernel $K(A, B)$ maps $R^{m \times n} \times R^{n \times l}$ into $R^{m \times l}$. A typical kernel is the Gaussian kernel:

$$\epsilon^{-\mu \|A_i' - B_j\|^2}, i,j = 1, \ldots, m, l = m$$

where $\epsilon$ is the base of natural logarithms, while a linear kernel is $K(A, B) = AB$. For a column vector x in $R^n$, $K(x', A')$ is a row vector in $R^m$, and the linear separating surface of equation (4) is replaced by the nonlinear separating surface:

$$K(x', A')D\nu = \gamma, \quad (16)$$

where $\nu$ is the solution of the dual problem of equation (8) appropriately modified as follows. For a linear kernel $K(A, A') = AA'$, $w = A'D\nu$ per equation (16). The primal linear programming SVM of equation (4) then becomes, upon using $w = p - q = A'D\nu$ and the 1-norm of $\nu$ in the objective instead of that of w:

$$\min_{(\nu,\gamma,y)} \nu e'y + \|\nu\|_1 \quad (17)$$

$$\text{s.t.} \quad D(AA'D\nu - e\gamma) + y \geq e$$

$$y \geq 0.$$

and setting:

$$\nu = r - s, r \geq 0, s \geq 0, \quad (18)$$

the linear programming formulation of (17) becomes:

$$\min_{(r,s,\gamma,y)} \nu e'y + e'(r+s) \quad (19)$$

$$\text{s.t.} \quad D(AA'D(r-s) - e\gamma) + y \geq e$$

$$r, s, y \geq 0,$$

which is the linear kernel SVM in terms of the dual variable $\nu = r - s$. If the linear kernel $AA'$ in equation (19) is replaced with the nonlinear kernel $K(A, A')$, the nonlinear kernel linear programming formulation is obtained as follows:

$$\min_{(r,s,\gamma,y)} \nu e'y + e'(r+s) \quad (20)$$

$$\text{s.t.} \quad D(K(A, A')D(r-s) - e\gamma) + y \geq e$$

$$r, s, y \geq 0.$$

Note that the linear programming formulation (20) is identical to the linear classifier SVM of equation (6) if:

$$A \to K(A, A')D, \quad (21)$$

in equation (6) and n→m. Hence, the results outlined in the Proposition above are applicable to a nonlinear kernel if the replacement of equation (21) is made in equation (9) and (15) and p→r, q→s, w→v in equation (15), and the nonlinear kernel classifier of equation (16) is used.

As in the linear case, the 1-norm formulation (21) leads to a very sparse $\nu$. Every zero component $\nu_i$ of $\nu$ implies non-dependence of the nonlinear kernel classifier on the kernel function $K(x', A'_i)$. This results because:

$$K(x', A')D\nu = \sum_{i=1}^{m} D_{ii}\nu_i K(x', A'_i) \quad (22)$$

$$= \sum_{\{i | \nu_i \neq 0\}} D_{ii}\nu_i K(x', A'_i).$$

An algorithmic implementation of the above linear programming proposition will now be described with respect to a fast Newton method, which may be referred to as a Newton Method for Linear Programming Support Vector Machine (NLPSVM). In particular, the dual exterior penalty of equation (9) is solved for a finite value of the penalty parameter $\epsilon$ by incorporating the nonnegativity constraint $u \geq 0$ into the objective function of equation (9) as a penalty term as follows:

$$\min_u f(u) = -\epsilon e'u + \frac{1}{2}\|(A'Du - e)_+\|^2 + \quad (23)$$

$$\frac{1}{2}\|(-A'Du - e)_+\|^2 + \frac{1}{2}\|e'Du\|^2 +$$

$$\frac{1}{2}\|(u - \nu e)_+\|^2 + \frac{\alpha}{2}\|(-u)_+\|^2.$$

The gradient of this function is given by:

$$\nabla f(u) = -\epsilon e + DA(A'Du - e)_+ - DA(-A'Du - e)_+ + Dee'Du + (u - \nu e)_+ - \alpha(-u)_+ \quad (24)$$

and its generalized Hessian as defined in equation (1) is given as follows:

$$\partial^2 f(u) = DA(\text{diag}((A'Du - e)_* + (-A'Du - e)_*)A'D + \quad (25)$$

$$Dee'D + \text{diag}((u - \nu e)_* + \alpha(-u)_*)$$

$$= DA(\text{diag}(|A'Du| - e)_*)A'D +$$

$$Dee'D + \text{diag}((u - \nu e)_* + \alpha(-u)_*),$$

where the last equality follows from the equality:

$$(a-1)_*+(-a-1)_*=(|a|-1)_*. \quad (26)$$

Given the above relationships, the Newton method for input feature selection can be described in detail. Specifically, the method involves letting $f(u)$, and $\nabla f(u)$ and $\partial^2 f(u)$ be defined by equations (23)-(25), and setting the parameter values $\nu$, $\epsilon$, $\delta$, tolerance tol, $\alpha$, and imax. Typically, $\epsilon=10^{-1}$ for nonlinear SVMs and $\epsilon=10^{-4}$ for linear SVMs, tol=$10^{-3}$, $\alpha=10^3$, and imax=50, while $\nu$ and $\delta$ are set by a tuning procedure described in detail later in this disclosure. Starting with any $u^0 \in R^m$, for i=0, 1, ... :

(I)

$$u^{i+1} = u^i - \lambda_i(\partial^2 f(u^i) + \delta I)^{-1} \nabla f(u^i) = u^i + \lambda_i d^i, \quad (27)$$

where the Armijo stepsize $\lambda_i = \max\{1, \frac{1}{2}, \frac{1}{4}, ...\}$ is such that:

$$f(u^i) - f(u^i + \lambda_i d^i) \geq -\frac{\lambda_i}{4} \nabla f(u^i)' d^i,$$

and $d^i$ is the modified Newton direction:

$$d^i = -(\partial^2 f(u^i) + \delta I)^{-1} \nabla f(u^i). \quad (28)$$

(II) Stop if $\|u^i - u^{i+1}\| \leq $ tol or i=imax. Else. set i=i+1, $\alpha=2\alpha$ and go to (I).

(III) Define the least 2-norm solution of the linear programming SVM of equation (6) using equation (15) with u=$u^i$.

A convergence result for this algorithm is set forth according to the following theorem. Let tol=0, imax=$\infty$, and let $\epsilon>0$ be sufficiently small. Each accumulation point $\bar{u}$ of the sequence $\{u^i\}$ generated by the above algorithm solves the exterior penalty problem (9). The corresponding $(\bar{w}, \bar{\gamma}, \bar{y})$ obtained by setting u to $\bar{u}$ in equation (15) is the exact least 2-norm solution to the primal linear program SVM of equation (6), as indicated by the following proof.

The fact that each accumulation point $\bar{u}$ of the sequence $\{u_i\}$ solves the minimization problem of equation (9) follows from exterior penalty results and standard unconstrained descent methods such as those detailed in O. L. Mangasarian, "Parallel gradient distribution in unconstrained optimization," *SIAM Journal on Control and Optimization*, 33(6): 1916-1925, 1995, and in this disclosure, and the facts that the direction choice $d_i$ of equation (19) satisfies, for some c>0:

$$-\nabla f(u^i)^1 d^i = \nabla f(u^i)^1 (\delta I + \partial^2 f(u^i))^{-1} \nabla f(u^i) \quad (29)$$

$$\geq c \|\nabla f(u^i)\|^2,$$

and that an Armijo stepsize is used per equation (27). The last statement of the theorem follows from the Proposition outlined above.

As an application note, it is useful to understand that determining the size of $\bar{\epsilon}$, such that the solution u of the quadratic program (11) for $\epsilon \in (0, \bar{\epsilon}]$, is the least 2-norm solution of problem (6), is not an easy problem theoretically. However, computationally, this does not seem to be critical and is effectively addressed as follows. By equation (11) above, if for two successive values of $\epsilon: \epsilon^1 > \epsilon^2$, the corresponding solutions of the $\epsilon$-perturbed quadratic program (11): $u^1$ and $u^2$ are equal, then under certain assumptions, $u=u^1=u^2$ is the least 2-norm solution of the dual linear programming formulation (6). This result can be implemented computationally by using an $\epsilon$ which, when decreased by some factor, yields the same solution to dual linear programming formulation (6).

EXAMPLES

In order to show that a fast Newton method as described herein can achieve very significant feature suppression, numerical tests and comparisons were carried out on a dataset with a high dimensional input space and a moderate number of data points. On the other hand, in order to show that the algorithm has a computational speed comparable to that of other fast methods, experiments also were performed on more conventional datasets where the dimensionality of the input space is considerably smaller than the number of data points.

All computations were performed on the University of Wisconsin Data Mining Institute "locop1" machine, which utilizes a 400 MHz Pentium II and allows a maximum of 2 Gigabytes of memory for each process. This computer runs on Windows NT server 4.0, with MATLAB 6 installed.

Because of the simplicity of the disclosed algorithm, a simple MATLAB implementation of the algorithm without the Armijo stepsize, which does not seem to be needed in most applications, is presented below. Although this is merely an empirical observation in the present case, it considerably simplifies the MATLAB code. However, it has also been shown herein that under a well conditioned assumption, not generally satisfied in this example, the proposed Newton algorithm indeed terminates in a finite number of steps without an Armijo stepsize. Note that this version of the algorithm is intended for cases where the number of data points m is smaller than the number of features n, i.e., when m<<n since the speed of the algorithm depends on m in a cubic fashion.

The following is example MATLAB code for implementing a Newton Linear Programming Support Vector Machine (NLPSVM) as described herein:

```
function [w,gamma]=nlpsvm(A,d,nu,delta)
%NLPSV: linear and nonlinear classification
% without Armijo
%INPUT: A, D, nu, delta. OUTPUT=w, gamma.
%[w,gamma]=nlpsvm(A,d,nu,delta)
epsi=10^(-4);alpha=10^3;tol=10^(-3);imax=50;
[m,n]=size(A);en=ones(n,1);em=ones(m,1);
u=ones(m,1);%initial point
iter=0;g=1;
epsi=epsi*em;nu=nu*em;
DA=spdiags(d,0,m,m)*A;
while (norm(g)>tol) & (iter<imax)
     iter=iter+1;
     du=d.*u;Adu=A'*du;
     pp=max(Adu-en,0);np=max(-Adu-en,0);
     dd=sum(du)*d;unu=max(u-nu,0);uu=max(-u,0);
     g=-epsi+(d.*(A*pp))-(d.*(A*np))+dd+unu-alpha*uu;
     E=spdiags(sqrt(sign(np)+sign(pp)),0,n,n);
     H=[DA*E d];
     F=delta+sign(unu)+alpha*sign(uu);
     F=spdiags(F,0,m,m);
     di=-((H*H'+F)\g);
     u=u+di;
end
du=d.*u;Adu=A'*du;
pp=max(Adu-en,0);np=max(-Adu-en,0);
w=1/epsi(1)*(pp-np);
gamma=-(1/epsi(1))*sum(du);
return
```

The above MATLAB code works not only for a linear classifier, but also for a nonlinear classifier per equations (1)

and (10). In the nonlinear case, the matrix K(A, A')D is used as input instead of A, and the pair (v, γ), is returned instead of (w, γ). The nonlinear separating surface is then given by equation (11) as:

$$K(x,A')Dv-\gamma=0. \tag{30}$$

Numerical testing and comparisons were carried out on the high dimensional Multiple Myeloma dataset available at: http://lambertlab.uams.edu/publicdata.htm. The structure of this dataset with very large n and (m<<n) results from the DNA microarray dataset used. Hence, feature selection is very desirable in such high dimensional problems. Other tests and comparisons were also carried out on six moderately dimensioned, publicly available datasets described below.

Multiple Myeloma Dataset

Multiple Myeloma is cancer of the plasma cell. The plasma cell normally produces antibodies that destroy foreign bodies such as bacteria. As a product of the Myeloma disease the plasma cells produce a tumor. These tumors can grow in several sites, usually in the soft middle part of bone, i.e., the bone marrow. When these tumors appear in multiples sites, they are called Multiple Myeloma. A detailed description of the process used to obtain the data can be found in David Page, Fenghuang Zhan, James Cussens, Michael Waddell, Johanna Hardin, Bart Barlogie, and John Shaughnessy, Jr., "Comparative data mining for microarrays: A case study based on multiple myeloma," Technical Report 1453, Computer Sciences Department, University of Wisconsin, November 2002.

The Multiple Myeloma data set consists of 105 data points. 74 of the points represent newly-diagnosed multiple Myeloma patients while 31 points represent 31 healthy donors. Each data point represents measurements taken from 7008 genes using plasma cell samples from the patients. For each one of the 7008 genes, there are two measurements. One measurement is called Absolute Call (AC) and takes on one of three nominal values: A (Absent), M (Marginal) or P (Present). The other measurement, the average difference (AD), is a floating point number that can be either positive or negative.

Figure 5:
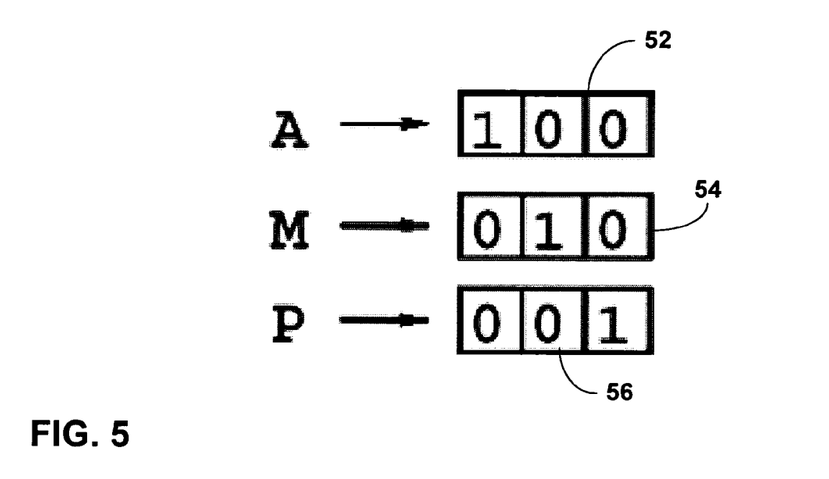
FIG. 5 is a graph illustrating an absolute call feature set.

FIG. 5 is a diagram illustrating an exemplary absolute call feature set. In particular, FIG. 5 depicts real-valued representations of the AC features set {A,M,P}. Since each one of the 7008 AC features takes on nominal values from the set {A,M,P}, a real valued representation is needed to utilize the SVM classifier disclosed herein, which requires an input of real numbers. Thus, each nominal value is mapped into a three-dimensional binary vector depending on the value that is being represented. This simple and widely used "1 of N" mapping scheme for converting nominal attributes into real-valued attributes is illustrated in FIG. 5.

Once this simple conversion is applied to the dataset, the AC feature space is transformed from a 7008-dimensional space with nominal values A, M, P into a 7008×3=21024 real-valued dimensional space. Adding the numerical AD feature for each of the 7008 genes results in each data point being transformed to a point in $R^{28032}$, with 21024 coming from the AC transformation mentioned above and 7008 from the AD values. This conversion makes this dataset very interesting for the disclosed algorithm, since a main objective is to show that it does a remarkable job of suppressing features especially for datasets in a very high dimensional input space.

Performance of the NLPSVM algorithm of the invention on the Myeloma dataset, in terms of feature selection and generalization ability, is first compared with two publicly available SVM solvers: the LSVM described in O. L. Mangasarian and D. R. Musicant, "Lagrangian support vector machines," Journal of Machine Learning Research, 1:161-177, 2001 and the NSVM described in G. Fung and O. L. Mangasarian, "Finite Newton method for Lagrangian support vector machine classification," Technical Report 02-01, Data Mining Institute, Computer Sciences Department, University of Wisconsin, Madison, Wis., February 2002.

Reported times for the LSVM here differ from the ones reported in the Mangasarian and Musicant paper because the calculation time for the matrix H of equation (9) is considered as input time in the Mangasarian and Musicant paper, whereas in this disclosure it is counted as part of the computational time. The other algorithm included in this comparison consists of solving the linear programming formulation (20) employing the widely used commercial solver CPLEX 6.5, commercially available from the ILOG CPLEX Division of CPLEX, Inc, Incline Village, Nev. This approach can be referred to as CPLEX SVM. Termination criteria for all methods, with the exception of CPLEX SVM, was set to tol=0.001, which is the default for LSVM. For CPLEX SVM, the termination criterion used was the default supplied in the commercial CPLEX package. Outlined below are some of the results of the comparative testing.

All three methods tested, NSVM, NLPSVM in accordance with the invention, and CPLEX SVM, obtained 100% leave-one-out correctness (looc). The following tuning procedure was employed for each of the 105 folds:

A random tuning set of the size of 10% of the training data was chosen and separated from the training set.

Several SVMs were trained on the remaining 90% of the training data using values of v equal to $2^i$ with i=-12, ..., 0, ..., 12. Values of the parameter δ tried were $10^j$ with j=-3, ..., 0, ..., 3. This made the search space for the pair (v, δ) a grid of dimension 25×7.

Values of v and δ that gave the best SVM correctness on the tuning set were chosen.

A final SVM was trained using the chosen values of v and δ and all the training data. The resulting SVM was tested on the testing data.

The remaining parameters were set to the following values: $\epsilon=4\times10^{-4}, \alpha=10^3, \text{tol}=10^{-3}, \text{imax}=50$. The NLPSVM method outperformed all others in the feature selection task, and obtained 100% looc using only 7 features out of 28032 original features. The closest contender was CPLEX SVM which required more than twice as many features.

The average CPU time required by the NLPSVM algorithm for the leave-one-out correctness (looc) computations was 75.16 seconds per fold and a total time for 105 folds was 7891.80 seconds. This outperformed CPLEX SVM both in CPU time and number of features used. CPLEX SVM had a CPU time of 108.28 per fold, a total time of 11369.40 seconds and used 28 features. However, NLPSVM was considerably slower than the NSVM, which had a CPU time of 4.20 seconds average per fold and total looc time of 441.00 seconds. The NSVM classifier required 6554 features, more than any classifier obtained by all other methods. LSVM failed and reported an out of memory error. These results are summarized in Table 1 below. In particular, Table 1 indicates looc results, total running times and number of average and overall features used by a linear classifier for the Myeloma dataset. The designation "oom" indicates "out of memory."

TABLE 1

| Data Set m × n (points × dimensions) | NSVM[8] looc Time (Sec.) Average Features | CPLEX SVM[11] looc Time (Sec.) Average Features Overall Features | LSVM[21] looc Time (Sec.) Average Features | NLPSVM looc Time (Sec.) Average Features Overall Features |
|---|---|---|---|---|
| Myeloma 105 × 28032 | 100.0% 441.00 6554 | 100.0% 11369.40 16 16 | oom oom oom | 100% 7891.80 7 7 |

Tests on six other datasets have been performed. In the following description, the effectiveness of NLPSVM in performing feature selection while maintaining accuracy and CPU time comparable to those of other methods that do not perform feature selection. The NLPSVM algorithm was tested for six publicly available datasets. Five datasets were from the University of California-Irvine Machine Learning Repository, and included the Ionosphere, Cleveland Heart, Pima Indians, BUPA Liver and Housing datasets. The sixth dataset is the Galaxy Dim dataset described in S. Odewahn, E. Stockwell, R. Pennington, R. Humphreys, and W. Zumach, "Automated star/galaxy discrimination with neural networks," Astronomical Journal, 103(1):318-331, 1992. The dimensionality and size of each dataset is given in Table 2 below.

TABLE 2

| Data Set m × n (points × dimensions) | NSVM Train Test Time (Sec.) Features | CPLEX SVM Train Test Time (Sec.) Features | LSVM Train Test Time (Sec.) Features | NLPSVM Train Test Time (Sec.) Features |
|---|---|---|---|---|
| Ionosphere 351 × 34 | 92.9% 88.9% 0.91 34 | 90.9% 88.3% 3.2 17.7 | 92.9% 88.9% 1.49 34 | 90.7% 88.0% 2.4 11.2 |
| BUPA Liver 345 × 6 | 70.3% 70.2% 0.24 6 | 71.2% 69.9% 5.17 6 | 70.3% 70.2% 0.92 6 | 70.6% 68.8% 1.13 4.8 |
| Pima Indians 768 × 8 | 77.7% 77.2% 0.55 8 | 76.8% 77.0% 3.94 5 | 77.7% 77.2% 2.30 8 | 76.8% 77.1% 1.07 4.9 |
| Cleveland Heart 297 × 13 | 87.2% 86.6% 0.14 13 | 85.9% 85.5% 1.08 7.5 | 87.2% 86.6% 0.31 13 | 86.5% 85.9% 0.55 7.1 |
| Housing 506 × 13 | 87.7% 86.8% 0.69 13 | 87.7% 85.0% 2.54 10.9 | 87.7% 86.8% 1.53 13 | 87.0% 85.2% 1.91 6.5 |
| Galaxy Dim 4192 × 14 | 94.0% 94.2% 6.67 14 | 94.7% 94.7% 29.82 5 | 94.0% 94.2% 71.56 14 | 94.4% 94.6% 8.90 3.4 |

In this set of experiments, linear classifier to was used to compare the NLPSVM method of the invention with LSVM, NSVM and CPLEX SVM on the six datasets mentioned above. Because m>>n for these datasets, it was preferable to use the Sherman-Morrison-Woodbury identity, described in G. H. Golub and C. F. Van Loan, "Matrix Computations," The John Hopkins University Press, Baltimore, Md., 3rd edition, 1996, to calculate the direction $d_i$ in the Newton iteration (28) and solve an (n+1)×(n+1) linear system of equations instead of an m×m linear system of equations. For this purpose define:

$$E^2 := \text{diag}(|A'Du| - e)^*.$$

$$H := D[A\,e].$$

$$\text{and } F := \text{diag}((u - \nu e)^* + \alpha(-u)^*) + \delta I. \tag{31}$$

Then, it follows from equation (25) that:

$$\partial^2 f(u) + \delta I = HH' + F. \tag{32}$$

which is the matrix with the inverse needed in the Newton iteration (28). Applying the Sherman-Morrison-Woodbury identity:

$$(HH' + F)^{-1} = F^{-1} - F^{-1}H(I + H'F^{-1}H)^{-1}H'F^{-1}.$$

Note that the inverse $F^{-1}$ of F is trivial to calculate because F is a diagonal matrix. This simple but effective algebraic manipulation makes the NLPSVM algorithm very fast even when m>>n but n is relatively small.

The values for the parameters ν and δ were again calculated using the same tuning procedure described above. The values of the remaining parameters were the same as those used with respect to the Myeloma dataset. As shown in Table 2, the correctness of the four methods was very similar. In addition, the execution time including tenfold cross validation for NSVM was less for all the datasets tested. However, all solutions obtained by NSVM depended on all of the original input features. In contrast, NLPSVM performed comparably to LSVM, and was always faster than CPLEX SVM, but used the least number of features on all of the datasets compared to all other methods tested.

In order to show that the NLPSVM algorithm can also be used to find nonlinear classifiers, three datasets from the University of California-Irvine Machine Learning Repository were chosen for which it is known that a nonlinear classifier performs better that a linear classifier. The NSVM, LSVM, CPLEX SVM and the disclosed LPSVM algorithm were used in order to find a nonlinear classifier based on the Gaussian kernel:

$$(K(A,B))_{i,j} = E^{-\mu \|A_i' - B_j\|^2},$$

$$i=1,\ldots,m, j=1,\ldots,k. \tag{32}$$

where $A \in R^{m \times n}$, $B \in R^{n \times k}$ and μ is a positive constant. The value of μ in the Gaussian kernel and the value of ν in all the algorithms were chosen by tuning on the values $2^i$ with i being an integer ranging from −12 to 12 following the same tuning procedure described above. The value of δ in the NLPSVM method was obtained also by tuning on the values $10^j$ with j=−3, . . . , 0, . . . , 3. The value of the parameter ε in was set to $10^{-1}$. The values of the remaining parameters were the same as with respect to the Myeloma dataset.

Because the nonlinear kernel matrix is square and since NLPSVM, NSVM and LSVM perform better on rectangular matrices, a rectangular kernel formulation was also used as described in the Reduced SVM (RSVM) described in Y. J. Lee and O. L. Mangasarian, "RSVM: Reduced support vector machines," Technical Report 00-07, Data Mining Institute, Computer Sciences Department, University of Wisconsin, Madison, Wis., July 2000, reprinted in Proceedings of the First SIAM International Conference on Data Mining, Chicago, Apr. 5-7, 2001, CD-ROM Proceedings.

This approach resulted in as good or better correctness and much faster running times for NLPSVM. The size of the random sample used to calculate the rectangular kernel was 10% of the size of the original dataset in all cases. These variations of NSVM, LSVM, CPLEX SVM and NLPSVM are referred to as Reduced NSVM, Reduced LSVM, Reduced CPLEX SVM and Reduced NLPSVM, respectively. The results are summarized in TABLE 3 below for these nonlinear classifiers.

TABLE 3

| Algorithm | Data Set m × n (points × dimensions) | Ionosphere 351 × 34 | BUPA Liver 345 × 6 | Cleveland Heart 297 × 13 |
|---|---|---|---|---|
| NSVM | Train | 96.1 | 75.7 | 87.6 |
| | Test | 95.0 | 73.1 | 86.8 |
| | Time (Sec.) | 23.27 | 25.54 | 17.51 |
| | Card(v) | 351 | 345 | 297 |
| Reduced NSVM | Train | 96.1 | 76.4 | 86.8 |
| | Test | 94.5 | 73.9 | 87.1 |
| | Time (Sec.) | 0.88 | 0.67 | 0.53 |
| | Card(v) | 35 | 35 | 30 |
| LSVM | Train | 96.1 | 75.7 | 87.6 |
| | Test | 95.0 | 73.1 | 86.8 |
| | Time (Sec.) | 23.76 | 27.01 | 12.98 |
| | Card(v) | 351 | 345 | 297 |
| Reduced LSVM | Train | 96.1 | 75.1 | 87.1 |
| | Test | 94.5 | 73.1 | 86.2 |
| | Time (Sec.) | 2.09 | 1.81 | 1.09 |
| | Card(v) | 35 | 35 | 30 |
| NLPSVM | Train | 94.4 | 75.4 | 86.9 |
| | Test | 93.5 | 73.9 | 86.2 |
| | Time (Sec.) | 195.31 | 187.91 | 70.47 |
| | Card(v) | 22.3 | 32.7 | 50.1 |
| Reduced NLPSVM | Train | 94.4 | 74.5 | 85.9 |
| | Test | 95.1 | 73.9 | 86.5 |
| | Time (Sec.) | 2.65 | 6.82 | 5.17 |
| | Card(v) | 14.6 | 16.4 | 12.3 |
| CPLEX SVM | Train | 99.2 | 76.4 | 87.8 |
| | Test | 96.1 | 73.6 | 86.2 |
| | Time (Sec.) | 34.8 | 34.48 | 18.37 |
| | Card(v) | 36.1 | 26.2 | 14.1 |
| Reduced CPLEX SVM | Train | 98.7 | 76.4 | 87.0 |
| | Test | 95.5 | 73.9 | 85.6 |
| | Time (Sec.) | 3.08 | 4.42 | 2.47 |
| | Card(v) | 26.9 | 18.7 | 12.6 |

Table 3 illustrates NVSM, LVSM, NLPSVM, CPLEX SVM and Reduced NSVM, LSVM, NLPSVM, CPLEX SVM in terms of training correctness, ten-fold testing correctness, ten-fold training times and cardinality of v(Card(v)) using a nonlinear classifier. Training and testing correctness and cardinality of v are all averages over ten folds, while time is the total time over ten folds.

Again, as in the linear case, the correctness of the four methods for a nonlinear SVM was similar on all the datasets. The execution time including ten-fold cross validation for NSVM was less for all the datasets tested, but with non-sparse solutions. NLPSVM performance was fast when a reduced rectangular kernel was used, and it obtained very sparse solutions that resulted in nonlinear kernel classifiers that are easier to store and to evaluate.

In general, the NLPSVM of the invention provides a fast and finitely terminating Newton method for solving a fundamental classification problem of data mining with a pronounced feature selection property for linear classifiers. When nonlinear classifiers are used, the algorithm performs feature selection in a high dimensional space of the dual variable, which results in a nonlinear kernel classifier that depends on a small number of kernel functions. This makes the method a very good choice for classification when feature selection or a fast nonlinear kernel classifier is required, as in the case of online decision-making such as fraud or intrusion detection.

Advantageously, the NLPSVM algorithm requires only a linear equation solver, which makes is simple, fast and easily accessible. In addition, NLPSVM can be applied very effectively to classification problems in very large dimensional input spaces, which is often the case in the analysis of gene expression microarray data. NLPSVM can also be used effectively for classifying large datasets in smaller dimensional input space. As such, NLPSVM is a versatile stand-alone algorithm for classification which is a valuable addition to the tools of data mining and machine learning.

The invention may be embodied as a computer-readable medium that includes instructions for causing a programmable processor to carry out the methods described above. A "computer-readable medium" includes but is not limited to read-only memory, random access memory, Flash memory, magnetic and optical storage media The instructions may be implemented as one or more software modules, which may be executed by themselves or in combination with other software. The instructions and the media are not necessarily associated with any particular computer or other apparatus, but may be carried out by various general-purpose or specialized machines. The instructions may be distributed among two or more media and may be executed by two or more machines. The machines may be coupled to one another directly, or may be coupled through a network, such as a local access network (LAN), or a global network such as the Internet.

The invention may also be embodied as one or more devices that include logic circuitry to carry out the functions or methods as described herein. The logic circuitry may include a processor that may be programmable for a general purpose, or a microcontroller, a microprocessor, a Digital Signal Processor (DSP), Application Specific Integrated Circuit (ASIC), and the like.

Various techniques described in this disclosure are also described in "A Feature Selection Newton Method for Support Vector Machine Classification," Glenn Fung and Olvi Mangasarian, Data Mining Institute Technical Report 02-03, September 2002, the entire content of which is incorporated herein by reference.

Various embodiments of the invention have been described. These and other embodiments are within the scope of the following claims.

The invention claimed is:

1. A computer-implemented method comprising:
defining a primal linear programming formulation of a support vector machine classifier;
solving an exterior penalty function of a dual of the primal linear programming formulation to produce a solution to the primal linear programming formulation of the support vector machine classifier; and
selecting an input set for the support vector machine classifier based on the solution.

2. The method of claim 1, further comprising minimizing the exterior penalty function for a finite value of a penalty parameter.

3. The method of claim 1, wherein the primal linear programming formulation is a 1-norm linear programming formulation.

4. The method of claim 1, wherein the solution is a least 2-norm solution.

5. The method of claim 1, wherein the support vector machine classifier is a linear support vector machine classifier, and selecting an input set includes selecting a set of input features of the linear support vector machine classifier.

6. The method of claim 1, wherein the support vector machine classifier is a nonlinear support vector machine classifier, and selecting an input set includes selecting a set of kernel functions for the nonlinear support vector machine classifier.

7. The method of claim 1, further comprising:
calculating a separating surface based on the input set and the support vector machine classifier; and
classifying data using the separating surface.

8. The method of claim 7, further comprising classifying the data into two sets of data using the separating surface.

9. The method of claim 7, wherein the separating surface is one of an n-dimensional hyperplane and a nonlinear surface.

10. The method of claim 1, further comprising applying a Newton-based algorithm to solve the exterior penalty function.

11. The method of claim 1, further comprising applying one or more linear constraints to the solution of the exterior penalty function.

12. The method of claim 1, wherein selecting an input set includes selecting a subset of input features from a larger set of input features that is substantially larger than the subset of input features.

13. The method of claim 12, wherein the subset of input features includes less than approximately one percent of the larger set of input features.

14. The method of claim 12, wherein the subset of input features includes less than approximately 0.1 percent of the larger set of input features.

15. The method of claim 12, wherein the larger set of input features includes more than 20,000 input features, and the subset of input features includes less than ten input features.

16. The method of claim 1, further comprising applying the support vector machine classifier to classify data relating to one of fraud detection, credit evaluation, gene expression, intrusion detection, medical diagnosis or medical prognosis.

17. The method of claim 1, further comprising applying the support vector machine classifier to classify data relating to multiple myeloma.

18. The method of claim 1, further comprising applying the support vector machine classifier to classify data relating to absolute call measurements for multiple myeloma.

19. A classification system comprising:
a processor that applies a primal linear programming formulation of a support vector machine classifier to classify data based on an input set; and
an input module that generates the input set based on a solution of an exterior penalty function of a dual of the primal linear programming formulation.

20. The system of claim 19, wherein the input module generates the input set based on a minimization of the exterior penalty function for a finite value of a penalty parameter.

21. The system of claim 19, wherein the primal linear programming formulation is a 1-norm linear programming formulation.

22. The system of claim 19, wherein the solution is a least 2-norm solution.

23. The system of claim 19, wherein the support vector machine classifier is a linear support vector machine classifier, and the input set includes a set of input features of the linear support vector machine classifier.

24. The system of claim 19, wherein the support vector machine classifier is a nonlinear support vector machine classifier, and the input set includes a set of kernel functions for the nonlinear support vector machine classifier.

25. The system of claim 19, wherein the processor calculates a separating surface based on the input set and the support vector machine classifier, and classifies data using the separating surface.

26. The system of claim 25, wherein the processor classifies the data into two sets of data using the separating surface.

27. The system of claim 25, wherein the separating surface is one of an n-dimensional hyperplane and a nonlinear surface.

28. The system of claim 19, wherein the input module applies a Newton-based algorithm to solve the exterior penalty function.

29. The system of claim 19, wherein the solution to the exterior penalty function is subject to one or more linear constraints.

30. The system of claim 19, wherein the input set is a subset of input features selected from a larger set of input features that is substantially larger than the subset of input features.

31. The system of claim 30, wherein the subset of input features includes less than approximately one percent of the larger set of input features.

32. The system of claim 30, wherein the subset of input features includes less than approximately 0.1 percent of the larger set of input features.

33. The system of claim 30, wherein the larger set of input features includes more than 20,000 input features, and the subset of input features includes less than ten input features.

34. The system of claim 19, wherein the processor applies the support vector machine classifier to classify data relating to one of fraud detection, credit evaluation, gene expression, intrusion detection, medical diagnosis or medical prognosis.

35. The system of claim 19, wherein the processor applies the support vector machine classifier to classify data relating to multiple myeloma.

36. The method of claim 19, wherein the processor applies the support vector machine classifier to classify data relating to absolute call measurements for multiple myeloma.

37. A computer-readable medium comprising instructions to cause a processor to:
define a primal linear programming formulation of a support vector machine classifier;
solve an exterior penalty function of a dual of the primal linear programming formulation to produce a solution to the primal linear programming formulation of the support vector machine classifier; and
select an input set for the support vector machine classifier based on the solution.

38. The computer-readable medium of claim 37, further comprising instructions to cause a processor to minimize the exterior penalty function for a finite value of a penalty parameter.

39. The computer-readable medium of claim 37, wherein the primal linear programming formulation is a 1-norm linear programming formulation.

40. The computer-readable medium of claim 37, wherein the solution is a least 2-norm solution.

41. The computer-readable medium of claim 37, wherein the support vector machine classifier is a nonlinear support vector machine classifier, and the input set includes a set of input features for the linear support vector machine classifier.

42. The computer-readable medium of claim 37, wherein the support vector machine classifier is a nonlinear support vector machine classifier, and the input set includes a set of kernel functions for the nonlinear support vector machine classifier.

43. The computer-readable medium of claim 37, further comprising instructions to cause a processor to:

calculate a separating surface based on the input set and the support vector machine classifier; and classify data using the separating surface.

44. The computer-readable medium of claim 43, further comprising instructions to cause a processor to classify the data into two sets of data using the separating surface.

45. The computer-readable medium of claim 43, wherein the separating surface is one of an n-dimensional hyperplane and a nonlinear surface.

46. The computer-readable medium of claim 37, further comprising instructions to cause a processor to apply a Newton-based algorithm to solve the exterior penalty function.

47. The computer-readable medium of claim 37, further comprising instructions to cause a processor to apply one or more linear constraints to the solution of the exterior penalty function.

48. The computer-readable medium of claim 37, further comprising instructions to cause a processor to select a subset of input features from a larger set of input features that is substantially larger than the subset of input features.

49. The computer-readable medium of claim 48, wherein the subset of input features includes less than approximately one percent of the larger set of input features.

50. The computer-readable medium of claim 48, wherein the subset of input features includes less than approximately 0.1 percent of the larger set of input features.

51. The computer-readable medium of claim 48, wherein the larger set of input features includes more than 20,000 input features, and the subset of input features includes less than ten input features.

52. The computer-readable medium of claim 37, wherein the instructions cause the processor to apply the support vector machine classifier to classify data relating to one of fraud detection, credit evaluation, gene expression, intrusion detection, medical diagnosis or medical prognosis.

53. The computer-readable medium of claim 37, wherein the instructions cause the processor to apply the support vector machine classifier to classify data relating to multiple myeloma.

54. The computer-readable medium of claim 37, wherein the instructions cause the processor to apply the support vector machine classifier to classify data relating to absolute call measurements for multiple myeloma.

55. A support vector machine classification system comprising:

a data storage medium storing input data for classification;

a support vector machine classifier that classifies the input data into a first set of data and a second set of data based on a set of input features; and a selection module that produces a reduced set of input features for the support vector machine classifier based on a minimization of an exterior penalty function of a dual of a primal linear programming formulation of the linear support vector machine classifier for a finite value of a penalty parameter.

56. The system of claim 55, wherein the selection module includes:

a dual generator that generates the dual of the primal linear programming formulation of the linear support vector machine classifier;

an exterior penalty function solver that minimizes the exterior penalty function of the dual; and a feature generator that generates the reduced set of input features for the support vector machine classifier.

57. The system of claim 55, wherein the support vector machine classifier classifies data relating to one of fraud detection, credit evaluation, gene expression, intrusion detection, medical diagnosis or medical prognosis.

* * * * *

UNITED STATES PATENT AND TRADEMARK OFFICE
CERTIFICATE OF CORRECTION

PATENT NO. : 7,421,417 B2
APPLICATION NO. : 10/650121
DATED : September 2, 2008
INVENTOR(S) : Mangasarian et al.

It is certified that error appears in the above-identified patent and that said Letters Patent is hereby corrected as shown below:

Column 3, line 11, "Functions" should be -- functions --

Column 5, line 24, "solved" should be -- solve --

Column 5, line 62, "$\partial^2 f(x) = A'diag\ (Ax - b) * A + P$" should be -- $\partial^2 f(x) = A'\ diag(Ax - b)_* A + P$ --

Column 5, line 64, "$diag\ (Ax - b)*$" should be -- $diag(Ax - b)_*$ --

Column 5, line 65, "$(A_i x - b_i)*,$" should be -- $(A_i x - b_i)_*,$ --

Column 6, line 1, "$x \in R_n,$" should be -- for all $x \in R_n,$ --

Column 6, line 43, "x'w-y+y$_i \geq$+1, for x'=A$_i$ and D$_{ii}$=+1." should be -- x'w-y+y$_i \geq$+l, for x'=A$_i$ and D$_{ii}$=+1. --

Column 6, line 45, "x'w-y+y$_i \leq$-1, for x'=A$_i$ and D$_{ii}$=-1." should be -- x'w-y+y$_i \leq$-l, for x'=A$_i$ and D$_{ii}$=-1. --

Column 7, line 38, "w=p-q, p$\geq$0, q$\geq$0," should be -- w=p-q, p$\geq$0, q$\geq$0, --

Column 8, lines 10-11,
"$0 \leq u \perp (- \epsilon \varepsilon + DA(A'\ Du - \varepsilon)_+ - DA(-A'\ Du - e)_+ + D\varepsilon e'\ Du + (u - ve)_+ \geq 0$"

should be -- $$0 \leq u \perp (-\epsilon e + DA(A'Du - e)_+ \\ -DA(-A'Du - e)_+ \\ +Dee'Du + (u - \nu e)_+ \geq 0,$$ --

Signed and Sealed this
Fourteenth Day of August, 2012

David J. Kappos
*Director of the United States Patent and Trademark Office*

CERTIFICATE OF CORRECTION (continued)
U.S. Pat. No. 7,421,417 B2

Column 8, line 24,

"$$\min_{(p,q,\gamma,y)} ve'+e'(p+q)+\frac{\varepsilon}{2}(\|p\|^2+\|q\|^2+\gamma^2+\|y\|^2)$$
$$s.t. D(A(p-q)-e\gamma)+y \geq e$$
$$p,q,y \geq 0$$"

should be --
$$\min_{(p,q,\gamma,y)} ve'y+e'(p+q)+\frac{\varepsilon}{2}(\|p\|^2+\|q\|^2+\gamma^2+\|y\|^2)$$
$$s.t. \quad D(A(p-q)-e\gamma)+y \geq e$$
$$p,q,y \geq 0;$$
--

Column 8, line 32, "$0 \leq \epsilon p \perp e+\epsilon p-A'Du \geq 0$" should be -- $0 \leq \epsilon p \perp e+\epsilon p-A'Du \geq 0$ --

Column 8, line 34, "$0 \leq \epsilon q \perp e+\epsilon q+A'Du=0$" should be -- $0 \leq \epsilon q \perp e+\epsilon q+A'Du-0$ --

Column 8, line 38, "$0 \leq \epsilon y \perp ve+\epsilon y-u \geq 0$" should be -- $0 \leq \epsilon y \perp ve+\epsilon y-u \geq 0$ --

Column 8, line 40, "$0 \leq u \perp DA(p-q)-De\gamma+y-e \geq 0$" should be -- $0 \leq u \perp DA(p-q)-De\gamma+y-e \geq 0$ --

Column 8, line 41, "positive $\epsilon$ such that $\epsilon \in (0,\bar{\epsilon}]$ for some $\bar{\epsilon} > 0$" should be -- positive $\varepsilon$ such that $\varepsilon \in (0,\bar{\varepsilon}]$ for some $\bar{\varepsilon} > 0$, --

Column 8, line 42, "(p, q, γ, y)" should be -- (p, q, λ, y) --

Column 8, line 62, "$a=b_+ \Leftrightarrow 0 \leq a \perp (a-b) \geq 0$" should be -- $a=b_+ \Leftrightarrow 0 \leq a \perp (a-b) \geq 0$ --

Column 9, line 34, "$\epsilon$" should be -- $\varepsilon$ --

Column 9, line 57, "$v=r-s, r \geq 0, s \geq 0$" should be -- $v=r-s, r \geq 0, s \geq 0$ --

Column 10, line 40, "$u \geq 0$" should be -- $u \geq 0$ --

Column 10, line 55,
"$\nabla f(u) = -\epsilon e + DA(A'Du-e)_+ - DA(-A'Du-e)_+ + Dee'Du + (u-ve)_+ - \alpha(-u)_+$"

should be --
$$\nabla f(u) = -\varepsilon e + DA(A'Du-e)_+ - DA(-A'Du-e)_+$$
$$+ Dee'Du + (u-\nu e)_+ - \alpha(-u)_+,$$
--

CERTIFICATE OF CORRECTION (continued)
U.S. Pat. No. 7,421,417 B2

Column 11, line 3, "$(a\text{-}1)*+(\text{-}a\text{-}1)*=(|a|\text{-}1)*.$" should be -- $(a\text{-}1)_*+(\text{-}a\text{-}1)_*=(|a|\text{-}1)_*.$ --

Column 11, line 51, "
$$\begin{aligned}-\nabla f(u^i)'d^i &= \nabla f(u^i)'(\delta I + \partial^2 f(u^i))^{-1}\nabla f(u^i)\\ &\geq c\|\nabla f(u^i)\|^2,\end{aligned}$$
"

should be --
$$\begin{aligned}-\nabla f(u^i)'d^i &= \nabla f(u^i)'(\delta I + \partial^2 f(u^i))^{-1}\nabla f(u^i)\\ &\geq c\|\nabla f(u^i)\|^2,\end{aligned}$$
--

Column 11, line 65, "values of $\epsilon:\epsilon^1 > \epsilon^2$" should be -- values of $\varepsilon : \varepsilon^1 > \varepsilon^2$, --

Column 13, line 9, "http://lambertlab.uams.edu/publicdata.htm." should be -- http://lambertlab.uams.edu/publicdata.htm. --

Column 16, line 5, "$E^2:=\text{diag}(|A'Du|-e)*.$" should be -- $E^2:=\text{diag}(|A'Du|-e)_*.$ --

Column 16, line 6, "H:=D[AEe]." should be -- H:=D[AE$e$]. --

Column 16, line 9, "and F:=diag((u-$v$e)*+α(-u)*)+δI." should be -- and F:=diag((u-$v$e)$_*$+α(-u)$_*$)+δI. --

Column 16, line 44, "$(K(A,B))_{ij} = E^{-\mu\|A_i-B_j\|^2}$  $i=1,...m, j=1,...,k.$" should be -- $(K(A,B))_{ij} = \varepsilon^{-\mu\|A_i'-B_j\|^2}$, $i=1,\ldots,m, j=1,\ldots,k.$ --